United States Patent
Fäth et al.

(10) Patent No.: US 11,148,495 B2
(45) Date of Patent: Oct. 19, 2021

(54) AIR SPRING SYSTEM, VEHICLE HAVING AN AIR SPRING SYSTEM, AND METHOD FOR MOUNTING AN AIR SPRING SYSTEM

(71) Applicant: SAF-HOLLAND GmbH, Bessenbach (DE)

(72) Inventors: Stefan Fäth, Aschaffenburg (DE); Stefan Wallmeier, Goldbach (DE); Stephan Dehlwes, Norderstedt (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 16/331,832

(22) PCT Filed: Sep. 19, 2017

(86) PCT No.: PCT/EP2017/073631
§ 371 (c)(1),
(2) Date: Mar. 8, 2019

(87) PCT Pub. No.: WO2018/054900
PCT Pub. Date: Mar. 29, 2018

(65) Prior Publication Data
US 2019/0248202 A1    Aug. 15, 2019

(30) Foreign Application Priority Data
Sep. 21, 2016    (DE) .................... 10 2016 117 769.5

(51) Int. Cl.
*B60G 11/28*    (2006.01)
*B60G 11/27*    (2006.01)
(Continued)

(52) U.S. Cl.
CPC ............ *B60G 11/27* (2013.01); *B60G 11/30* (2013.01); *B60G 11/28* (2013.01); *B60G 15/12* (2013.01);
(Continued)

(58) Field of Classification Search
CPC ........ B60G 11/27; B60G 11/28; B60G 15/12; B60G 11/30; B60G 2202/152; B60G 2204/1302
See application file for complete search history.

(56) References Cited

U.S. PATENT DOCUMENTS 2,934,352 A * 4/1960 Ruegg ................. B60G 17/052
267/64.27
3,655,214 A 4/1972 Lane et al.
(Continued)

FOREIGN PATENT DOCUMENTS

CN    205239051 U    5/2016
DE    19503454 A1    8/1996
(Continued)

OTHER PUBLICATIONS

European Patent Office; International Search Report; dated Nov. 27, 2017.

*Primary Examiner* — Karen Beck
(74) *Attorney, Agent, or Firm* — Price Heneveld LLP

(57) ABSTRACT

An air spring system for a vehicle axle includes a link element which can be pivotably arranged on a vehicle frame for mounting the vehicle axle, an air spring which can be arranged on the link element and has a piston, and an additional reservoir, the link element having an upper side which faces the vehicle frame and a lower side which faces away from the vehicle frame, the additional reservoir being configured to be mounted on the lower side of the link element, and the air spring being configured to be mounted on the upper side of the link element.

24 Claims, 3 Drawing Sheets

(51) Int. Cl.
   *B60G 11/30*   (2006.01)
   *B60G 15/12*   (2006.01)
(52) U.S. Cl.
   CPC .............. *B60G 2202/152* (2013.01); *B60G 2204/1302* (2013.01)

(56) References Cited

U.S. PATENT DOCUMENTS

| | | | |
|---|---|---|---|
| 4,858,949 A | 8/1989 | Wallace et al. | |
| 6,250,613 B1 | 6/2001 | Koeske et al. | |
| 2004/0251653 A1* | 12/2004 | Momiyama | B60B 35/08 280/124.157 |
| 2012/0175858 A1* | 7/2012 | Hendriks | B60G 7/02 280/124.161 |
| 2013/0099459 A1* | 4/2013 | Remboski | B60G 11/27 280/124.16 |
| 2014/0300076 A1* | 10/2014 | Fulton | B60G 11/27 280/124.161 |
| 2020/0191226 A1* | 6/2020 | Fath | F16F 9/0281 |

FOREIGN PATENT DOCUMENTS

| | | | |
|---|---|---|---|
| DE | 102004011466 | | 10/2004 |
| DE | 102013113577 | A1 | 6/2015 |
| DE | 102014005023 | | 10/2015 |
| DE | 102014008121 | | 12/2015 |
| GN | 202046381 | U | 11/2011 |
| GN | 105339697 | A | 2/2016 |
| JP | 2006007798 | | 1/2006 |
| WO | 2009011582 | | 1/2009 |
| WO | 2012087917 | | 6/2012 |
| WO | 2012145451 | | 10/2012 |
| WO | WO-2018206558 | A1 * | 11/2018 ............ F16F 9/0454 |

* cited by examiner

AIR SPRING SYSTEM, VEHICLE HAVING AN AIR SPRING SYSTEM, AND METHOD FOR MOUNTING AN AIR SPRING SYSTEM

BACKGROUND OF THE INVENTION

The present invention relates to an air spring system, to a vehicle having an air spring system, and to a method for mounting an air spring system.

Air springs are well known from the prior art. They are typically used to cushion a vehicle axle or to change a ride level of a vehicle. Essential constituent parts of the air spring are a piston and an air bellows, it being possible for the air bellows and the piston to be displaced relative to one another. Here, the air bellows rolls on an outer face of the piston during a compression movement and a rebound movement. To this end, the air bellows is preferably manufactured from an elastic material, by way of which a folding movement can be brought about during the rolling movement. In addition, a damping action is brought about by the fact that a fluid, in particular air, flows to and fro via a constricted cross section between a working space, which is provided by way of the air bellows and the piston, and a chamber which is configured in the piston. The vibrations which are introduced are damped on account of the constricted cross section and the associated friction.

The damping behavior of an air spring of this type is dependent on the available air volume. In order to increase the volume, it is therefore known to connect the working space to an additional volume in the form of a separate additional reservoir. An air spring, the piston of which is connected via a connecting channel to an additional volume vessel, is known from the prior art, for example from document DE 10 2004 011 466 A1. Here, however, the additional volume takes up additional installation space and has to be mounted in a correspondingly complicated manner.

It is therefore an object of the present invention to provide an air spring system which is improved with regard to its mounting and compactness in comparison with the air spring systems from the prior art.

SUMMARY OF THE INVENTION

According to the invention, an air spring system for a vehicle axle is provided, comprising a link element which can be pivotably arranged on a vehicle frame for mounting the vehicle axle, an air spring, in particular an air spring which is provided for air damping, which can be arranged on the link element and has a piston, and an additional reservoir, the link element having an upper side which faces the vehicle frame and a lower side which faces away from the vehicle frame. It is provided here that the additional reservoir can be mounted on the lower side of the link element, and the air spring can be mounted on the upper side of the link element. In comparison with the prior art, it is provided according to the invention to mount the air spring and the additional reservoir on the link element on opposite sides, namely on the upper side and on the lower side. This proves to be advantageous, in so far as it is no longer necessary to dismantle the entire unit of the air spring and the additional reservoir in the case of a replacement of the air spring or the additional reservoir. In particular, this relates to a replacement of an air bellows of the air spring, which air bellows has on average a lower service life in comparison with the additional reservoir on account of its continuous loading during the compression and the rebound. Here, the air spring and the additional reservoir are preferably configured as separate components which are mounted on the link element in each case on interface regions which are provided on the upper side and the lower side, respectively, of the link element. Accordingly, the additional reservoir and the air spring can be configured in each case as compact units for fastening, in particular screwing, to the link element. The interface regions are configured, for example, with cutouts and/or bulges (for example, with the formation of a recess) in such a way that the additional reservoir and/or the air spring can be prepositioned on the link element. It is provided, in particular, that the air spring is fastened to the link element via the piston. Furthermore, it is preferably provided that the air spring bears against the upper side and the additional reservoir bears against the lower side of the link element, in each case at least partially, preferably in a predominantly flat manner. It is a further advantage of the mounting of the air spring and the additional reservoir on opposite sides that solely the air spring has to be designed for the loads to be expected during cushioning or damping, whereas the additional reservoir which is fastened to the lower side of the link element remains substantially load-free during cushioning or damping. It is accordingly possible, for example, for the additional reservoir to be of substantially free design with regard to material characteristics. For example, the additional reservoir can be configured from a plastic. In particular, an air spring system is provided, in which the link element is articulated pivotably on the vehicle frame, the piston of an air spring being mounted on the upper side of the link element, and the additional reservoir being mounted on the lower side of the link element. In addition, the air spring is fastened by way of one side to the vehicle frame and by way of another side to the link element. Furthermore, it is preferably provided that the upper side and the lower side are part of a common wall of the link element, which common wall preferably has a thickness of between 0.5 cm and 4 cm. In addition to the piston, the air spring comprises, in particular, the air bellows. Said air bellows preferably has an elastically deformable cylindrical shell which is attached on one side to the piston, for example via a clamping ring, and on the other side to the vehicle frame. During a cushioning movement, a working volume is reduced which is enclosed by the piston and the air bellows, and in which working volume fluid, in particular air, is collected. Furthermore, the air can escape from the working volume through a cross section in the piston, as a result of which a damping effect for the air spring and therefore for a pivoting movement of the link element with the mounted vehicle axle can be achieved.

It is provided in accordance with a further embodiment of the present invention that the additional reservoir and the air spring are attached to the link element via fastening means, preferably via a common fastening means. The utilization of a common fastening means proves advantageous, in so far as the overall number of components required for mounting the air spring system can thus be kept as low as possible. In addition, only a single fastening step or working step is required, by way of which the air spring and the additional reservoir can together be connected to the link element. To this end, the common fastening means preferably connects a part of the air spring which bears against the upper side to a part of the additional reservoir which bears against the lower side. A screw is preferably provided as fastening means.

In order to simplify the mounting of the additional reservoir on the link element, it is provided, in particular, that the fastening means engages through the additional reservoir and/or the link element. As a result, the additional reservoir and/or the air spring can be attached or mounted in a simple and uncomplicated way on the link element by way of the fastening means from below, that is to say in a manner which comes from a lower side of the additional reservoir, which lower side faces away from the vehicle frame. To this end, it is provided, in particular, that the fastening means is longer than the region to be engaged through in the additional reservoir. It is also conceivable that a wall of the additional reservoir has a recessed contour shape in the region, in which the fastening means is inserted. For example, the wall forms a depression here, in order to countersink a screw head, in order that the fastening means does not protrude, but rather terminates substantially flush with the wall outside the depression region, in particular on a side which faces away from the vehicle frame.

It is preferably provided that an interface region on the upper side, on which the air spring is mounted, and an interface region on the lower side, on which the additional reservoir is mounted, of or on the link element lie opposite one another. In particular, the air spring and the additional reservoir are arranged in such a way that a wall of the link element forms a dividing wall between the air spring on one side and the additional reservoir on the other side. As a result, the spacing between the additional reservoir and the air system is kept as small as possible, with the result that no complex line system is required, by way of which a fluid coupling would otherwise have to be realized between the additional reservoir and the air spring. It is preferably provided that the additional reservoir and the air spring are connected to the link element in the interface regions via a fastening means, in particular via the common fastening means.

It is advantageously provided here that the additional reservoir and the air spring lie at least partially above one another, in the mounted state, in a direction which runs perpendicularly with respect to the upper side and/or perpendicularly with respect to the lower side of the longitudinal carrier. Said arrangement advantageously allows the additional reservoir and the air spring to be attached to the link element in the same region, as a result of which a compact arrangement and correspondingly simplified mounting are possible on account of their spatial proximity.

It is provided in a further embodiment of the present invention that the air spring and the additional reservoir are connected to one another for a gas exchange via a channel which reaches through the link element. A fluid coupling between the additional reservoir and the air spring is possible through the channel. A line system which runs along on the outer side of the link element and leads from the upper side of the link element to the lower side of the link element is advantageously dispensed with as a result of the channel which runs through the link element.

A valve for controlling the gas exchange is preferably provided. A damping characteristic can advantageously be adapted to different driving situations via the valve. It is conceivable here that the valve is embedded into the link element or into the channel.

It is preferably provided that the additional reservoir and the air spring are arranged in an end region or terminating region of the link element (what is known as a tail end) as viewed in the longitudinal direction. As a result, a lever arm length which is as long as possible on the pivotably mounted link element is not only realized, but rather said region is also comparatively readily accessible for the mounting or for the replacing of individual parts on account of the spacing from the vehicle axle.

It is expediently provided that the air spring extends over a first length as viewed in the longitudinal direction, and the additional reservoir extends over a second length as viewed in the longitudinal direction, the second length being greater than the first length. Here, the first length is dimensioned, in particular, as a diameter of the air spring or the piston. The ratio between the first length and the second length preferably assumes a value of between 0.6 and 0.9, preferably of between 0.66 and 0.83, and particularly preferably of between 0.72 and 0.75.

Furthermore, it is conceivable that the additional reservoir extends over a height in a direction which runs perpendicularly with respect to the longitudinal direction and in a direction which runs perpendicularly with respect to the lower side, the first length being greater than the height of the additional reservoir. It is preferably provided that the ratio of the height to the second length assumes a value of between 0.3 and 0.8, preferably of between 0.4 and 0.6, and particularly preferably of between 0.43 and 0.53.

Furthermore, it is provided that the additional reservoir tapers as viewed in the longitudinal direction, in particular with regard to its height. The additional reservoir preferably comprises a first end and a second end as viewed in the longitudinal direction, the first additional reservoir being thicker at the first end than at the second end. The first end preferably faces the seat for the vehicle axle.

It is provided in accordance with a further embodiment of the present invention that the fastening means is in multiple pieces. For example, a first part of the fastening means can be plugged through the additional reservoir, and the other part is connected to the first part of the fastening means in a manner which comes from the opposite side, in order to connect the additional reservoir to the link element.

It is provided in a further embodiment of the present invention that the link element has side walls, it being possible for the additional reservoir to be inserted at least partially, preferably predominantly, with an accurate fit or in a positively locking manner into a hollow region which is defined by the lower side of the link element and the side walls. In particular, the side walls project from that wall of the link element which has the upper side and the lower side, in particular perpendicularly. In particular, a particularly compact air spring system is realized by way of the insertion of the additional reservoir into said hollow region. For the insertion, the hollow region has an open side, via which the additional reservoir is introduced into the hollow region during mounting. The side walls not only advantageously stabilize the link element, they preferably comprise the seat for mounting the vehicle axle. Moreover, the side walls protect the additional reservoir if the additional reservoir is positioned between them.

Furthermore, it is conceivable that the additional reservoir is configured in such a way that an intermediate space is configured between the side wall and the additional reservoir in the mounted state. Said intermediate space prevents the additional reservoir from becoming jammed with the link element, and simple access to the additional reservoir is possible. This simplifies the removal of the additional reservoir. A ratio of a gap width (measured in the transverse direction) between the additional reservoir and the side wall and a width (measured in the transverse direction) of the additional reservoir preferably assumes a value of between 0.1 and 0.25, preferably of between 0.075 and 0.125 and particularly preferably of between 0.083 and 0.094.

It is provided in a further or supplementary embodiment of the present invention that a seat which is provided for mounting the vehicle axle forms a boundary for the hollow region, the shape of the additional reservoir preferably being adapted on one side to the boundary which is predefined by way of the seat. As a result, the hollow region can be utilized as completely as possible for the additional reservoir. Here, the side of the additional reservoir is preferably of curved configuration.

It is provided in a further embodiment of the present invention that the additional reservoir is configured in such a way that it projects with respect to the side walls as viewed in a direction which runs perpendicularly with respect to the lower side of the link element. As a result, the access to the additional reservoir is simplified, since direct contact of that region of the additional reservoir which projects with respect to the side walls is possible, and the additional reservoir can subsequently merely be pulled out of the hollow region.

It is provided in accordance with a further embodiment of the present invention that the additional reservoir is fixed or mounted exchangeably on the lower side of the link element via a reversibly releasable coupling mechanism. In particular, the additional reservoir can be replaced if required by the driving situations to be expected. At the same time, it is also conceivable that a smaller additional reservoir is used if it is foreseeable that this is sufficient for the situations to be expected.

The additional reservoir is preferably mounted on the link element via belts which are fastened to the link element. In particular, a plurality of belts which are distributed in the longitudinal direction are provided. The stability of the connection between the additional reservoir and the link element can be further increased advantageously by means of the belts. In particular, the belts ensure an attachment to the link element in a region which is spaced apart from the interface region, in which the additional reservoir is fastened to the link element via the fastening means.

It is provided in a further embodiment of the present invention that the coupling mechanism is additionally provided for fastening by way of the fastening means. As a result, the additional reservoir can be prefixed on the link element by means of the coupling mechanism, in order to be subsequently fixed finally by way of the fastening means.

The object is likewise achieved by way of a vehicle having an air spring system in accordance with the preceding embodiments. All of the features described for the air spring system and the advantages thereof can likewise be transferred analogously to the vehicle according to the invention, and vice versa.

The object is likewise achieved by way of a method for mounting an air spring system in accordance with the preceding embodiments, comprising the method steps:
arranging of an additional reservoir on a lower side of a link element,
arranging of an air spring on an upper side of the link element, and
fastening of the additional reservoir to the lower side of the link element, and fastening of the air spring to the upper side of the link element. All of the features described for the air spring system according to the invention and the advantages thereof can likewise be transferred analogously to the method according to the invention, and vice versa.

It is provided in accordance with a further embodiment of the present invention that the air spring is arranged on the upper side temporally after the arranging of the additional reservoir on the lower side. It is preferably provided here that the air spring is placed onto the upper side of the link element temporally after the arranging of the additional reservoir on the link element. Subsequently, the connection of the air spring and the additional reservoir to the link element takes place, for example by way of a screw connection.

BRIEF DESCRIPTION OF THE DRAWINGS

Further advantages and features result from the following description of preferred embodiments of the subject matter according to the invention with reference to the appended figures. Individual features of the individual embodiments can be combined with one another here within the context of the invention.

In the figures.

DETAILED DESCRIPTION OF THE PREFERRED EMBODIMENTS

In the various figures, identical parts are always provided with the same designations and will therefore as a rule also be named or mentioned in each case only once.

Figure 1A:
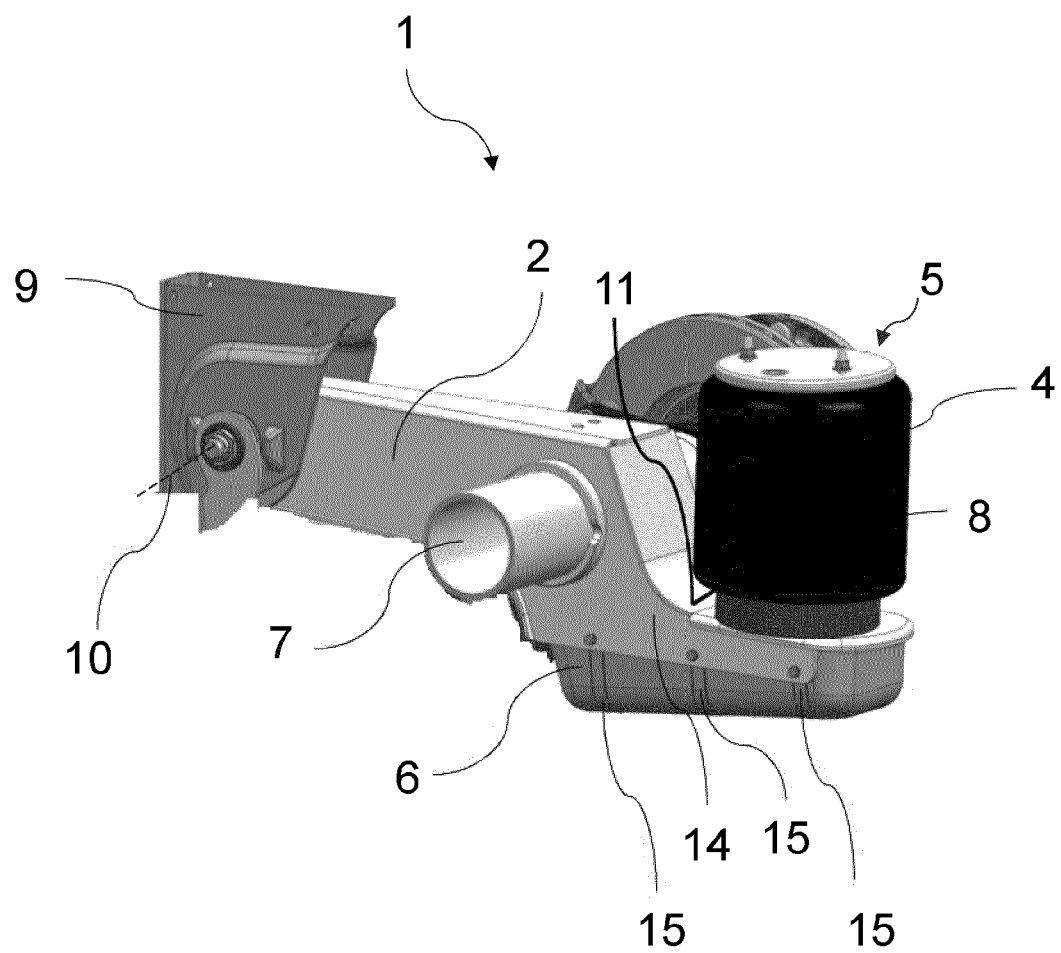
FIGS. 1a and 1b: show diagrammatic illustrations of an air spring system in accordance with a first preferred embodiment of the present invention, in a perspective view (1a) and a sectional view (1b)
Figure 1B:
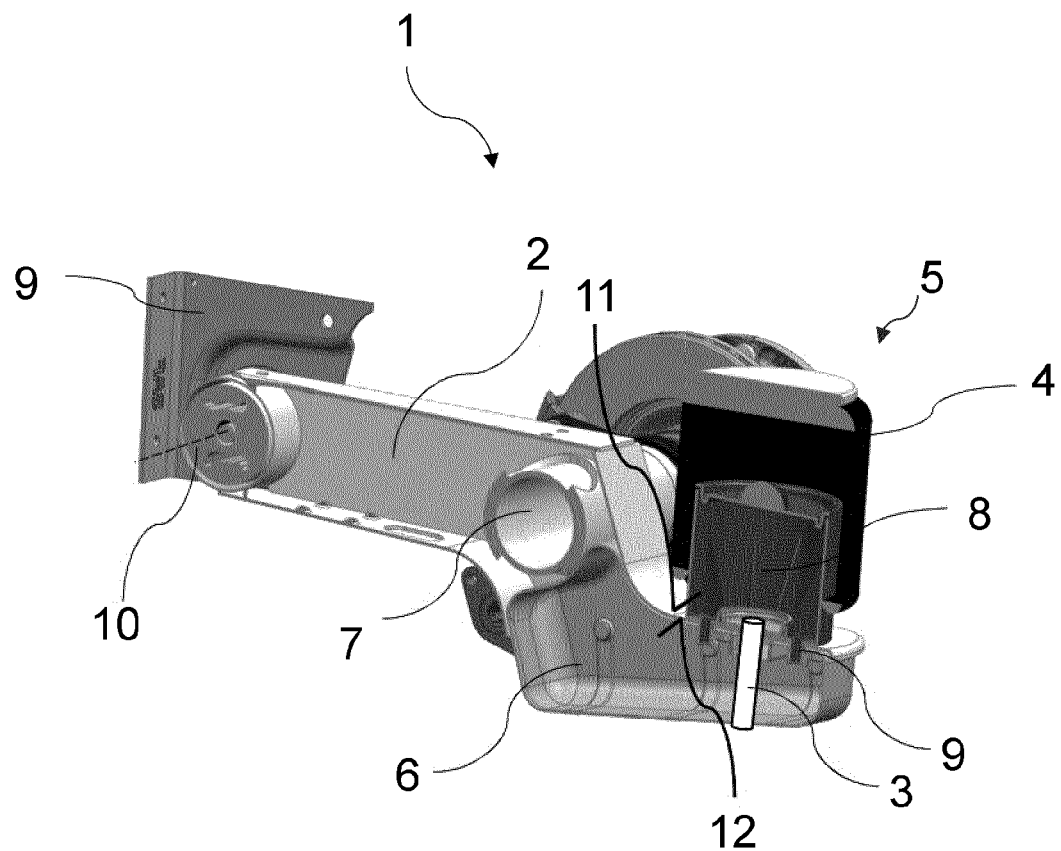

FIGS. 1a and 1b diagrammatically show a perspective view (1a) and a sectional view (1b) of an air spring system 1 in accordance with a first preferred embodiment of the present invention. In particular, this is an air spring system 1 which is provided for a vehicle axle. Here, the vehicle axle is mounted in a link element 2, preferably on a link element 2 which runs in the longitudinal direction of the vehicle, the link element 2 in turn being articulated on a vehicle frame 9 at a first end such that it can be pivoted about a pivot axis 10. The air spring 5 is arranged at a second end which lies opposite the first end as viewed in the longitudinal direction. A seat 7 is preferably provided in the link element 2 between the first end and the second end, in particular in a half of the longitudinal carrier 2 which faces the second end, through which seat 7 the vehicle axle engages in the mounted state or in which seat 7 the vehicle axle is mounted rotatably. In order to bring about a cushioning action on the pivoting movement of the link element 2 and therefore on the vehicle axle which is mounted in the link element, the air spring 5 connects the link element 2 to the vehicle frame 9 (not shown here). In particular, the air spring 5 connects the link element 2 to a region on the vehicle frame 9, which region is arranged substantially above the attachment of the air spring 5 on the link element 2, that is to say above the second end of the link element 2, as viewed in the vertical direction. Essential constituent parts of the air spring 5 are a piston 8 and an air bellows 4, it being possible for the air bellows 4 and the piston 8 to be displaced relative to one another, in particular along the vertical direction. Here, the air bellows 4 comprises a cylindrical shell which is manufactured from an elastic material and performs a folding movement during pushing together of the air bellows 4 and the piston 8. Here, the cylindrical shell is connected to an outer side of the piston 8 at one end, for example via a clamping ring, whereas the other end of the air bellows 4 is connected to a lower side of the vehicle frame 9. Here, a damping action is generated by way of a fluid, such as air, in the working space between the piston 8 and the air bellows 4. Furthermore, it is provided that the piston 8 is mounted directly on an upper side of the link element 2 which faces the vehicle frame 9.

In addition, an additional reservoir 6 is provided, by way of which a filling quantity of the fluid in the working space between the piston 8 and the air bellows 4 can be controlled or can be introduced into the air from the working space. It is provided here according to the invention that the additional reservoir 6 is arranged on a lower side 12 of the link element 12, which lower side 12 faces away from the vehicle frame 9. It is advantageously possible by way of said arrangement to replace the additional reservoir 6 and the air spring 5 separately, without it being necessary for the entire system comprising the additional reservoir 6 and the air spring 5 to be dismantled. In particular, it proves advantageous that the air spring 5, in particular the air bellows 4, with its service life which is on average shorter, can be removed from the air spring system 1 without it being necessary for the additional reservoir 6 to be removed. In order to ensure a fluid exchange between the air spring 5 and the additional reservoir 6, a channel 13 is provided, in particular a channel 13 which reaches through the link element 2. Said channel 13 preferably comprises a valve, by way of which the fluid exchange between the additional reservoir 6 and the air spring 5 can be controlled or regulated. The additional reservoir 6 is mounted, in particular, below the air spring 5 on the lower side 12 of the link element 2 for a distance which is as short as possible and has to be bridged between the additional reservoir 6 and the air spring 5 for the fluid exchange. The link element 2 preferably forms a dividing wall between the air spring 5 and the intermediate reservoir 6. As a result, an additional feed line can advantageously be dispensed with. It is provided, furthermore, that the additional reservoir 6 is arranged within a hollow region which is open toward one side and is formed by substantially vertically running side walls 14 and the lower side 12. As a result, the additional reservoir 6 is protected by way of the side walls 14. In addition, the side walls 14 provide the seat for the vehicle axle and stabilize the link element 2. Furthermore, the additional reservoir 6 is preferably shaped in such a way that it can be inserted into the hollow region with an accurate fit. For example, the hollow region is delimited on one of its sides by way of a seat for the vehicle axle, and the additional reservoir 6 is shaped accordingly on that side, for example by way of a correspondingly complementary curved configuration. For simple access to the additional reservoir 6, the additional reservoir 6 is configured in such a way that it projects with respect to the side walls 14. Furthermore, a belt 15 is provided which can be mounted on the side walls 14 of the link element 2 and runs around a lower side of the additional reservoir 6, which lower side faces away from the vehicle frame 9, in such a way that the additional reservoir 6 is protected from below by the belt 15. A plurality of belts 15 which are arranged behind one another in the longitudinal direction preferably serve as a mounting aid or an additional stabilizing fastening, whereas a fastening means 3 which engages through the additional reservoir 6, for example a screw which serves for a central screw connection, attaches the additional reservoir 6 to the link element 2. The fastening means 3 is preferably arranged in a region, in which the additional reservoir 6 and the air spring 5 lie above one another in a direction which runs perpendicularly with respect to the upper side of the link element 2.

Figure 2:
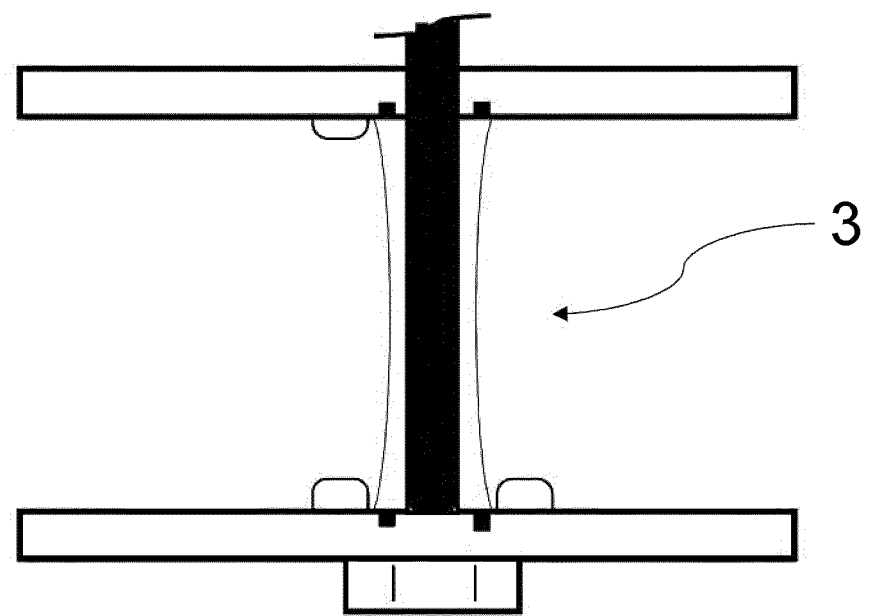
FIG. 2: shows a detailed view of an air spring system in accordance with a second preferred embodiment of the present invention.

FIG. 2 shows a detailed view of an air spring system 1 in accordance with a second preferred embodiment of the present invention. This is a detailed illustration of the fastening means 3, by way of which the additional reservoir 6 is fastened to the link element 2. The link element 2 preferably has a cutout, through which the fastening means 3 engages and which is utilized for attaching the piston 8 of the air spring 5. In other words, both the additional reservoir 6 and the air spring 5 can be fastened to the link element 2 by way of a common fastening means 3 which engages through the link element 2. Here, the additional reservoir 6 is preferably placed onto the link element 2 first of all, and the air spring 5 is placed onto it subsequently. Finally, the permanent attachment takes place by way of the fastening means 3, in particular by way of a fastening means 3 which comprises steel.

LIST OF DESIGNATIONS

1 Air spring system
2 Link element
3 Fastening means
4 Air bellows
5 Air spring
6 Additional reservoir
7 Seat
8 Piston
9 Vehicle frame
10 Pivot axis
11 Upper side
12 Lower side
13 Channel
14 Side wall
15 Belt

The invention claimed is:

1. An air spring system for a vehicle axle, comprising:
a link element configured to be pivotably arranged on a vehicle frame for mounting a vehicle axle;
an air spring configured to be arranged on the link element and including a piston; and
an additional reservoir;
the link element having an upper side which substantially faces the vehicle frame and a lower side which substantially faces away from the vehicle frame; and
the additional reservoir being configured to be mounted on the lower side of the link element, and the air spring being configured to be mounted on the upper side of the link element, the additional reservoir being mounted exchangeably on the lower side of the link element via a releasable coupling mechanism;
the additional reservoir and the air spring being attached to the link element via a fastening member.

2. An air spring system for a vehicle axle, comprising:
a link element configured to be pivotably arranged on a vehicle frame for mounting a vehicle axle;
an air spring configured to be arranged on the link element and including a piston; and
an additional reservoir; the link element having an upper side which substantially faces the vehicle frame and a lower side which substantially faces away from the vehicle frame; and the additional reservoir being configured to be mounted on the lower side of the link element, and the air spring being configured to be mounted on the upper side of the link element, the additional reservoir being mounted exchangeably on the lower side of the link element via a releasable coupling mechanism; the additional reservoir and the air spring being attached to the link element via a fastening member; and
the fastening member comprising a screw.

3. The air spring as claimed in claim 1, the fastening member engaging through the additional reservoir and/or the link element.

4. The air spring system as claimed in claim 3, the upper side including an interface region, on which the air spring is mounted, the lower side including an interface region, on which the additional reservoir is mounted, the interface region of the upper side and the interface region of the lower side lying opposite one another on the link element.

5. The air spring system as claimed in claim 4, the additional reservoir and the air spring lying at least partially above one another, in the mounted state, in a direction which runs perpendicularly with respect to the upper side and/or perpendicularly with respect to the lower side of the link element.

6. The air spring system as claimed in claim 5, the air spring and the additional reservoir being connected to one another for a gas exchange via a channel which reaches through the link element.

7. The air spring system as claimed in claim 6, further comprising:
a valve controlling the gas exchange.

8. The air spring system as claimed in claim 7, the additional reservoir and the air spring being arranged in an end region as viewed in the longitudinal direction of the link element.

9. The air spring system as claimed in claim 8, the link element having side walls, the additional reservoir configured to be inserted at least partially, in a positively locking manner into a hollow region which is defined by the lower side of the link element and the side walls.

10. The air spring system as claimed in claim 9, further comprising:
a seat configured for mounting the vehicle axle forming a boundary for the hollow region, a shape of the additional reservoir being adapted on one side to the boundary predefined by the seat.

11. The air spring system as claimed in claim 10, the additional reservoir configured such that the additional reservoir projects with respect to the side walls as viewed in a direction which runs perpendicularly with respect to the lower side of the link element.

12. The air spring system as claimed in claim 11, the additional reservoir being mounted on the link element via belts which are fastened to the link element.

13. The air spring as claimed in claim 1, the fastening member engaging through the additional reservoir and/or the link element.

14. The air spring system as claimed in claim 1, the upper side including an interface region, on which the air spring is mounted, the lower side including an interface region, on which the additional reservoir is mounted, the interface region of the upper side and the interface region of the lower side lying opposite one another on the link element.

15. The air spring system as claimed in claim 1, the additional reservoir and the air spring lying at least partially above one another, in the mounted state, in a direction which runs perpendicularly with respect to the upper side and/or perpendicularly with respect to the lower side of the link element.

16. The air spring system as claimed in claim 1, the air spring and the additional reservoir being connected to one another for a gas exchange via a channel which reaches through the link element.

17. The air spring system as claimed in claim 16, further comprising:
a valve controlling the gas exchange.

18. The air spring system as claimed in claim 1, the additional reservoir and the air spring being arranged in an end region as viewed in the longitudinal direction of the link element.

19. The air spring system as claimed in claim 1, the link element having side walls, the additional reservoir configured to be inserted at least partially, in a positively locking manner into a hollow region which is defined by the lower side of the link element and the side walls.

20. The air spring system as claimed in claim 19, further comprising:
a seat configured for mounting the vehicle axle forming a boundary for the hollow region, a shape of the additional reservoir being adapted on one side to the boundary predefined by the seat.

21. An air spring system for a vehicle axle, comprising:
a link element configured to be pivotably arranged on a vehicle frame for mounting a vehicle axle;
an air spring configured to be arranged on the link element and including a piston; and
an additional reservoir;
the link element having an upper side which substantially faces the vehicle frame and a lower side which substantially faces away from the vehicle frame; and
the additional reservoir being configured to be mounted on the lower side of the link element, and the air spring being configured to be mounted on the upper side of the link element, the additional reservoir being mounted exchangeably on the lower side of the link element via a releasable coupling mechanism;
the link element having sidewalls, and the additional reservoir configured such that the additional reservoir projects with respect to the side walls as viewed in a direction which runs perpendicularly with respect to the lower side of the link element.

22. The air spring system as claimed in claim 1, the additional reservoir being mounted on the link element via belts which are fastened to the link element.

23. A vehicle that includes the air spring system as claimed in claim 1.

24. A method for mounting the air spring system as claimed in claim 1 on a vehicle, comprising:
arranging the additional reservoir on the lower side of a link element;
arranging the air spring on the upper side of the link element; and
fastening the additional reservoir to the lower side of the link element via the releasable coupling mechanism, and fastening the air spring to the upper side of the link element.

* * * * *

UNITED STATES PATENT AND TRADEMARK OFFICE
CERTIFICATE OF CORRECTION

| | |
|---|---|
| PATENT NO. | : 11,148,495 B2 |
| APPLICATION NO. | : 16/331832 |
| DATED | : October 19, 2021 |
| INVENTOR(S) | : Stefan Fäth et al. |

It is certified that error appears in the above-identified patent and that said Letters Patent is hereby corrected as shown below:

In the Specification

Column 7, Line 7 (first occurrence):
"12" should be — 2 —

In the Claims

Column 8, Claim 3, Line 65:
After "spring" insert -- system --

Column 9, Claim 13, Line 44:
After "spring" insert -- system --

Signed and Sealed this
Seventeenth Day of May, 2022

*Katherine Kelly Vidal*

Katherine Kelly Vidal
*Director of the United States Patent and Trademark Office*